US005603800A

United States Patent [19]

Wheatley et al.

[11] Patent Number: 5,603,800

[45] Date of Patent: Feb. 18, 1997

[54] APPARATUS FOR MANUFACTURING LAMPSHADES

[75] Inventors: Jeremy D. Wheatley, St. Albans; Andrew C. Diamond, Welwyn Garden City, both of United Kingdom

[73] Assignee: Welwyn Lighting Designs Limited, Hertfordshire, United Kingdom

[21] Appl. No.: 392,092

[22] Filed: Feb. 22, 1995

[30] Foreign Application Priority Data

Feb. 23, 1994 [GB] United Kingdom .................. 9403432

[51] Int. Cl.$^6$ .................................................. B32B 31/04

[52] U.S. Cl. .......................... 156/479; 156/213; 156/217; 156/477.1; 156/478; 156/481; 425/393; 362/358

[58] Field of Search .................................. 156/479, 213, 156/216, 477.1, 478, 480, 481; 425/393; 362/358, 351, 361

[56] References Cited

U.S. PATENT DOCUMENTS

| | | | |
|---|---|---|---|
| 2,859,061 | 11/1958 | Reid | 156/213 |
| 3,057,768 | 10/1962 | McGough | 156/213 |
| 3,484,518 | 12/1969 | Ignell | 264/322 |
| 4,867,929 | 9/1989 | Albrecht et al. | 264/296 |
| 4,896,415 | 1/1990 | Bock | 264/296 |
| 5,176,607 | 1/1993 | Hill et al. | 425/393 |

FOREIGN PATENT DOCUMENTS

| | | | |
|---|---|---|---|
| 517195 | 10/1955 | Canada | 156/479 |
| 1245721 | 3/1960 | France . | |
| 1431002 | 1/1966 | France . | |
| 2160786 | 6/1973 | France . | |
| 2345661 | 10/1977 | France | 362/358 |
| 8017078 | 6/1980 | Germany . | |
| 3024141 | 1/1982 | Germany . | |
| 9110029.1 | 2/1992 | Germany . | |
| 62-11615 | 1/1987 | Japan . | |
| 2240388 | 7/1991 | United Kingdom | 362/351 |

*Primary Examiner*—Michele K. Yoder
*Attorney, Agent, or Firm*—Webb Ziesenheim Bruening Logsdon Orkin & Hanson, P.C.

[57] ABSTRACT

A lampshade is manufactured from heat deformable sheet material by forming a blank of the sheet material, in the shape of a sector of an annulus, into a hollow truncated cone having upper and lower peripheral edges. The overlapping edges of the blank are welded or bonded together and the blank supported by an apparatus which engages the interior of the conical blank, which apparatus includes an upper former for engagement with the interior surface of the blank adjacent the upper edge thereof and a lower support, releasably supporting a stiffening ring around its periphery, for example magnetically, so that upper marginal edge portion of the blank projects beyond the upper former and so that the lower marginal edge portion of the blank projects beyond the stiffening ring supported by the lower support. Heating means heat the marginal edge portions and upper and lower die members engage the heated and softened marginal edge portions to fold or roll the deformable sheet material respectively around the edge portion of the upper former around the stiffening ring supported by the lower support and thereafter hold the formed edge portions in place until the material has cooled. The edge portion of the upper former has the form of a rounded beads so that the edge portion of the material deformed therearound has the form of an incompletely closed cavity or pocket. The edge portion of the material deformed around the stiffening ring forms a pocket retaining the stiffening ring. The workpiece is removed from the apparatus after retracting the lower support inwardly from the stiffening ring. A mounting bracket having a peripheral ring is fitted with the peripheral ring being pushed into the cavity or pocket at the upper edge of the blank.

9 Claims, 13 Drawing Sheets

APPARATUS FOR MANUFACTURING LAMPSHADES

THIS INVENTION relates to the manufacture of lampshades, more particularly for the manufacture of lampshades of a heat-deformable sheet material or fabric secured to a mounting frame adapted to be fitted, for example, to a standard electric lamp socket. Such a lampshade is herein referred to as being "of the kind specified".

Figure 1:
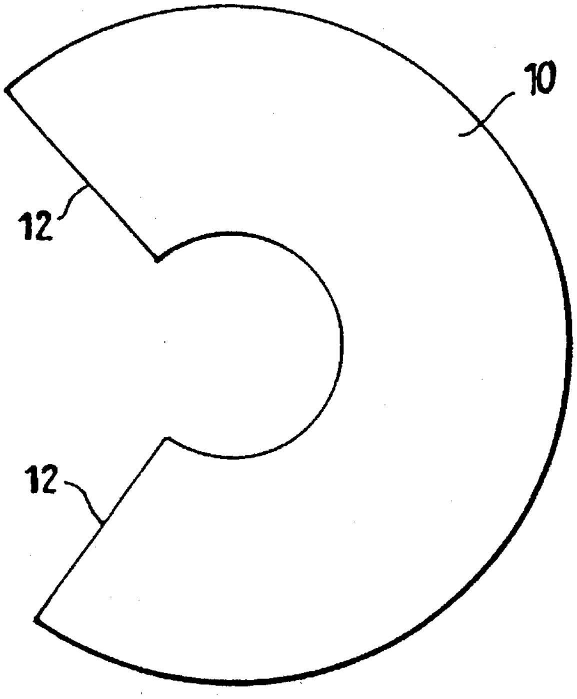
Figure 2:
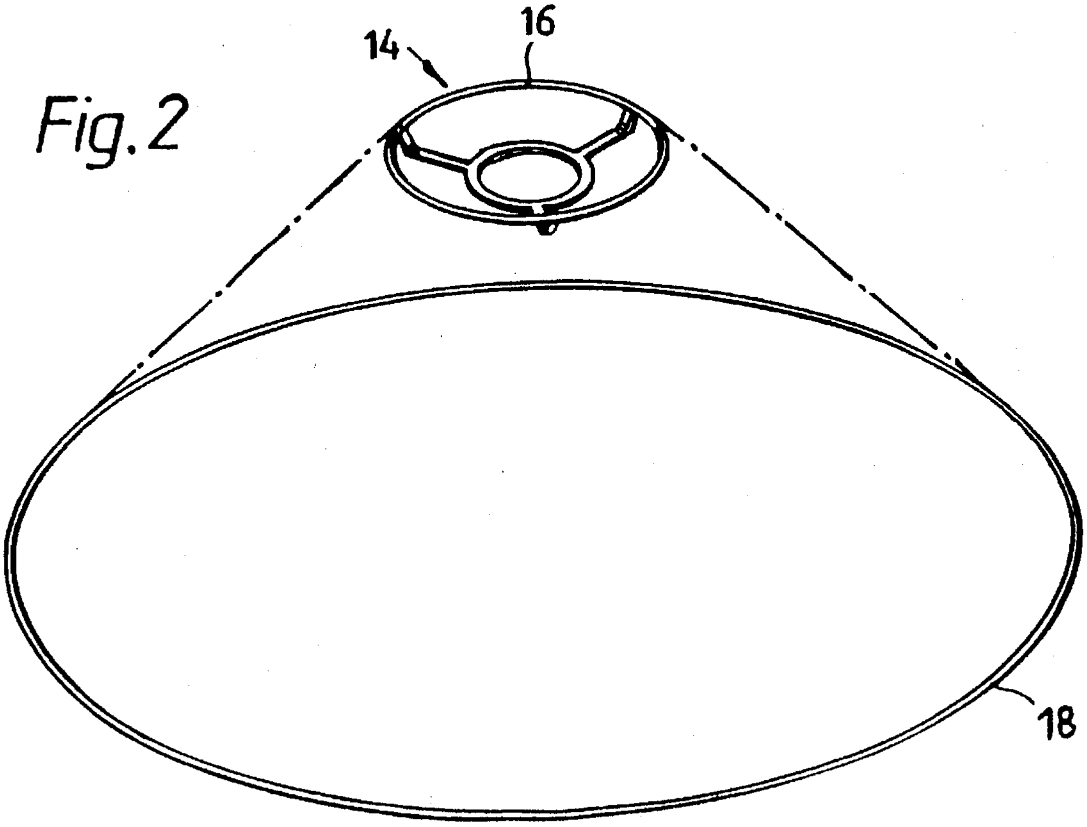

It is known to manufacture lampshades of the kind specified, using a lampshade material which comprises a decorative fabric adhered to a plastics backing sheet which lends dimensional stability and stiffness to the fabric and facilitates handling during manufacture. Referring to FIGS. 1 and 2, in manufacture, an arcuate panel 10 of such material is cut (see FIG. 1) and bent into frustoconical form so that the ends 12 of the panel arc meet, these ends being then secured together, for example by stitching, welding or adhesive tape to form a hollow truncated cone 20 indicated by broken lines in FIG. 2. The mounting frame 14 (illustrated in perspective in FIG. 2), which has an outer annular ring 16, for example of round metal wire, is then secured to the truncated cone at or adjacent the upper, smaller-diameter end. A similar wire ring 18 may be secured at the lower or wider end of the cone 20.

In one known method of manufacture, the upper and lower edges of the truncated cone 20 are secured to the wire rings 16, 18 by means of adhesive tape extended around the upper and lower edge regions of the hollow truncated cone and stuck thereto so as to extend laterally beyond the respective edges of the truncated cone, and such tape is folded lengthwise around the respective rings 16, 18 to engage the inner surface of the truncated cone adjacent the respective edge and is likewise adhered to the inner surface of the shade material. The last-noted procedure is generally carried out manually, but is relatively straightforward. This technique has the disadvantage of inevitably leaving the fastening tape to view and, unless the free edges of the fastening tape on the inside and outside of the shade happen to be in exact register on the inner and outer side of the shade material, something which it is almost impossible to ensure manually in practice, the inner portion of the tape is likewise rendered visible, as a shadow, on the shade material, when the shade is in use, detracting from the appearance of the shade.

In another known method of manufacture the upper edge region of the cone is folded over around the wire ring 16 and is either adhesively secured to the wire ring 16 itself or, on the inside of the shade, is stuck to the inner surface of the shade material. This other procedure, which is also carried out manually, avoids the need to have visible securing tape, but is somewhat more involved. Thus, because the plastics film backing the fabric is so effective in dimensionally stabilising the fabric, folding of the fabric around the rings 16, 18 is not readily possible unless the plastics film is removed from the portion to be folded around the respective wire frame 16, 18. Accordingly, localised removal of the plastics backing is necessary. However, it is not possible merely to remove a border region of the plastics backing extending to the respective free arcuate edge of the fabric panel, since such removal would permit fraying of the fabric. Instead, it is necessary to remove an arcuate band of the plastics backing adjoining and paralleling the respective free arcuate edge but spaced slightly therefrom to leave intact a thin band of plastics material at the free edge to prevent such fraying. Thus, this technique is particularly expensive. The last-mentioned technique also has the disadvantage that, if not carried out with sufficient skill, the free edges of the fabric within the lampshade extend beyond the respective wire frames 16, 18 and cast discernible shadows on the interior of the lampshade.

It is among the objects of the present invention to provide a method of manufacturing a lampshade of the kind specified which avoids the disadvantages of the above-noted methods, and to provide an apparatus for use in carrying out the method.

In our co-pending European Patent Application No. 93307419.7, published as EP0595461A, corresponding to U.S. Pat No. 08/139572, there is described and claimed a method of manufacturing a lampshade of the kind specified from a heat-formable sheet material, comprising forming a blank of such sheet material into the form of a hollow body having upper and lower peripheral edges, temporarily holding the blank in this shape, heating a said peripheral edge of said hollow body to a temperature at which it is formable, folding said heated edge around a former to form an incompletely closed cavity or pocket extending around the respective end of the blank, allowing the material to cool, extracting said former from said cavity or pocket and subsequently inserting into said cavity or pocket a complementary part of a mounting frame.

European Patent Application No. 93307419.7 (EP0595461A) also discloses and claims apparatus for manufacturing a lampshade of the kind specified, comprising means for supporting a hollow body formed from such sheet material and having upper and lower peripheral edges, the apparatus including a former for peripheral engagement with the interior surface of said hollow body adjacent a said peripheral edge thereof, so that a marginal edge portion of said body projects beyond said former, means for heating such marginal edge portion, means for engaging said marginal edge portion after such heating and folding or rolling it around a peripheral rounded bead of said former and for holding the formed edge portion in place until the material has cooled, so that the edge portion of said material formed around said bead has the form of an incompletely closed cavity or pocket.

According to one aspect of the present invention, there is provided a method of manufacturing a lampshade from a heat-formable sheet material, comprising forming a blank of such sheet material into the form of a hollow body having upper and lower peripheral edges, holding the blank in this shape, locating, within the hollow body and in engagement therewith adjacent a peripheral edge of the hollow body, a forming and stiffening ring, heating said peripheral edge of said hollow body to a temperature at which it is formable, folding said heated edge around said forming and stiffening ring whereby the forming and stiffening ring is held captive within a cavity or pocket extending around the respective end of the blank, and allowing the material to cool.

According to another aspect of the invention there is provided apparatus for use in manufacturing a lampshade from a heat-deformable sheet material comprising means for supporting a hollow body formed from such sheet material and having upper and lower peripheral edges, the apparatus including means for releasably supporting a forming and stiffening ring with said ring in peripheral engagement with the interior surface of said hollow body adjacent a said peripheral edge thereof, so that a marginal edge portion of said body projects beyond said forming and stiffening ring, means for heating such marginal edge portion, means for engaging said marginal edge portion after such heating and folding or rolling it around said forming and stiffening ring and for holding the formed edge portion in place until the material has cooled.

In the accompanying drawings

Figure 13:
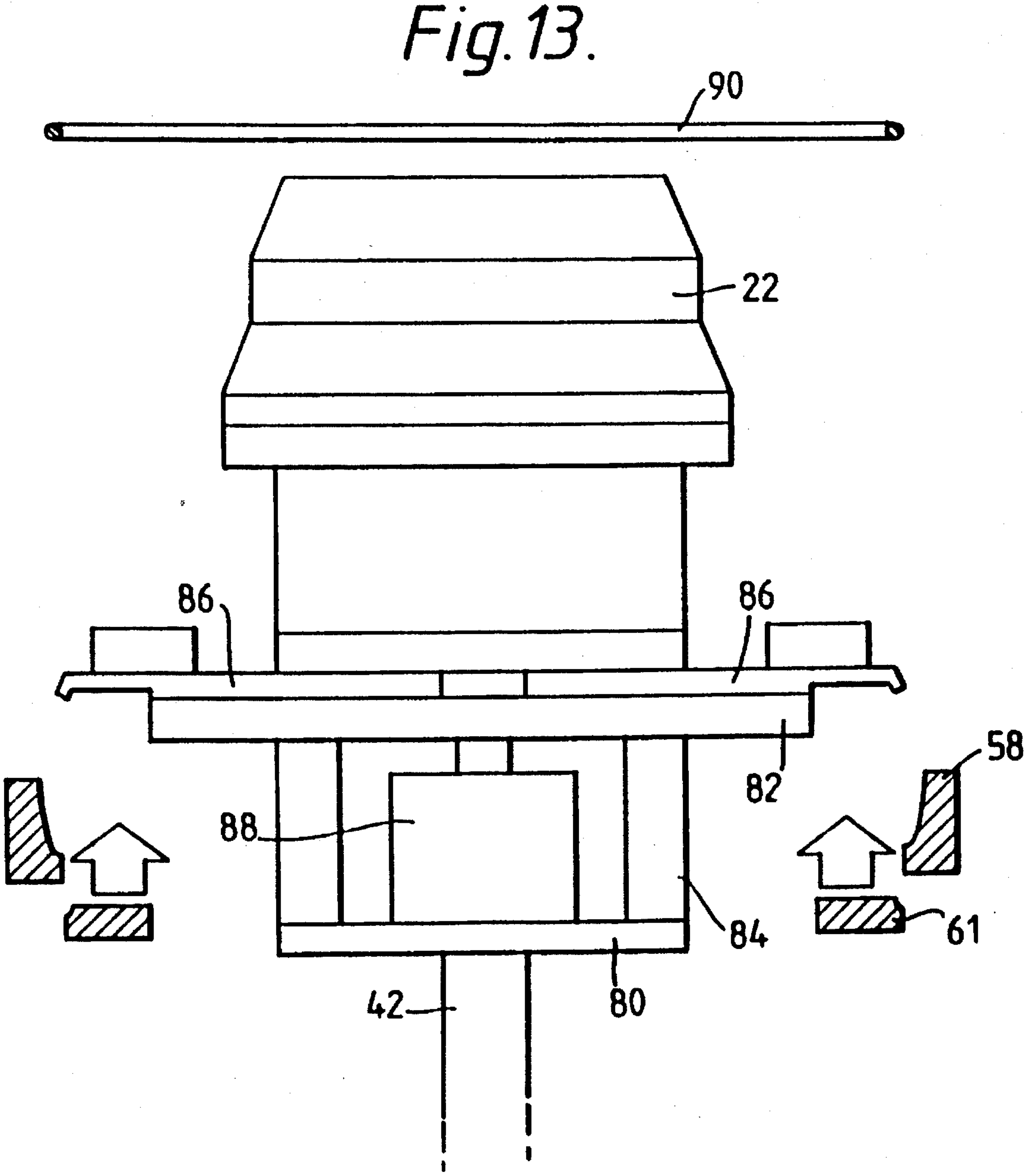
Figure 14:
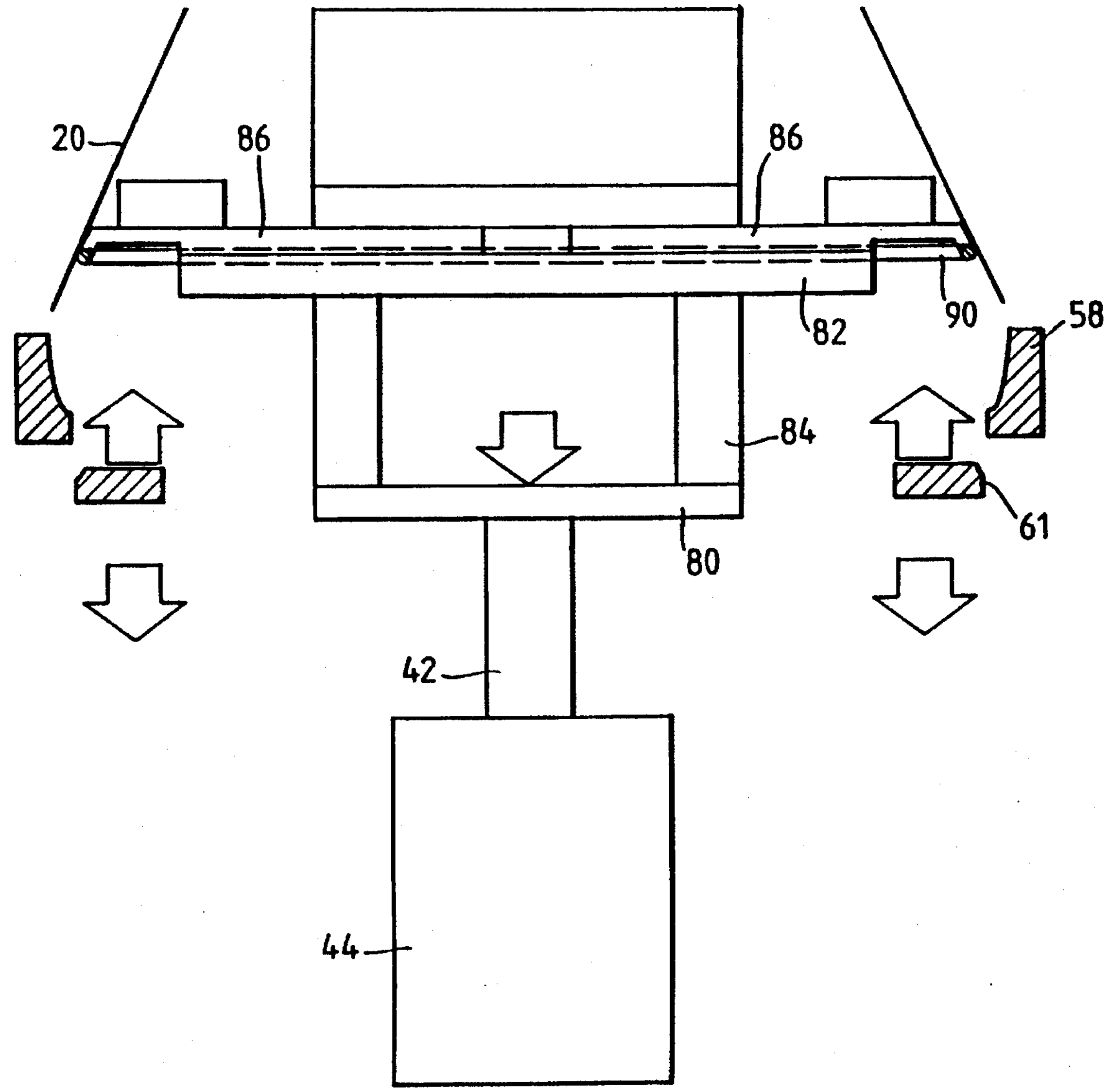

FIGS. 1 and 2 illustrate steps in known methods of manufacture, as discussed above, FIGS. 3 to 12 are axial section views illustrating successive stages in the manufacture of a lampshade by a method in accordance with co-pending U.S. patent application Ser. No. 08/139572, utilising an apparatus described in that co-pending application, and FIGS. 13 and 14 are corresponding axial section views of a variant of the apparatus of FIGS. 3 to 12, embodying the present invention and illustrating steps in a variant method of manufacture.

FIGS. 1 to 12 appear in our co-pending U.S. Pat. No. 08/139572, as does most of the following description, with reference to these figures which is reproduced here for reference and by way of background explanation.

Referring to FIGS. 3 to 12, the manufacture of a lampshade, using a decorative fabric having, adhered to one face thereof, a dimensionally stable flexible plastics sheeting, commences, as in conventional practice, with the cutting from such composite material, of a workpiece of the shape illustrated in FIG. 1 and described above. This workpiece is placed in a welding jig whilst being rolled into a conical configuration so that the opposite ends 12 of the workpiece overlap. The welding jig incorporates edge and end location stops such that the workpiece is held precisely in the shape of a hollow truncated cone 20 of predetermined dimensions. The overlapping edge portions are temporarily secured together by tack welds, whilst the workpiece is in the welding jig.

The intermediate product 20 thus formed, is then removed from the former and fitted into the apparatus shown in FIGS. 3 to 12. This apparatus includes an upper former 22 and a lower former 23 both generally circular in plan, the upper former being of smaller diameter than the lower former, such that in the position of the apparatus shown in FIGS. 3 and 4 the upper former can engage the interior of the truncated cone 20 adjacent the upper end of the latter whilst the lower former, located within the cone 20 adjacent the lower end thereof, is spaced only slightly from the inner surface of the cone.

Figure 3:
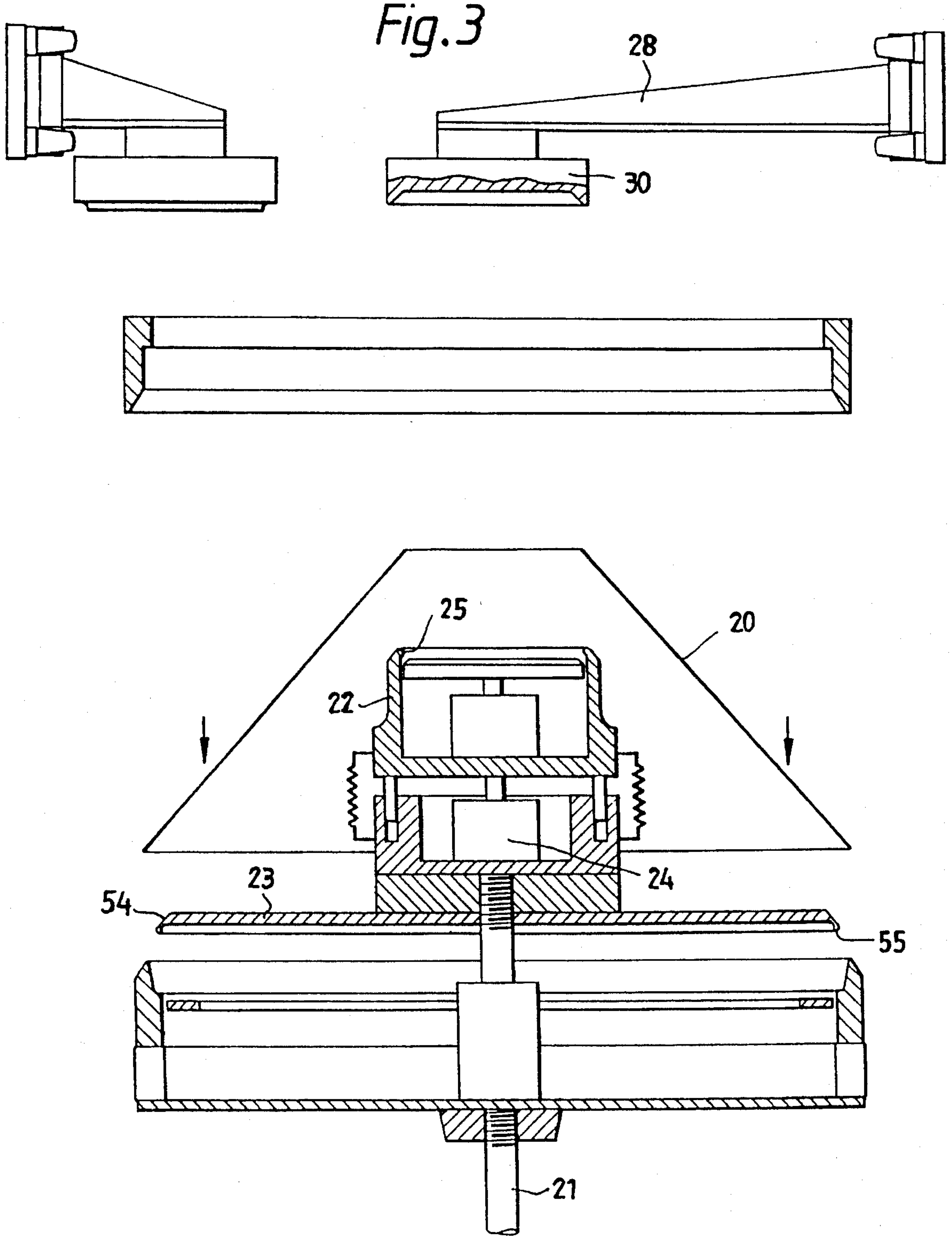
Figure 4:
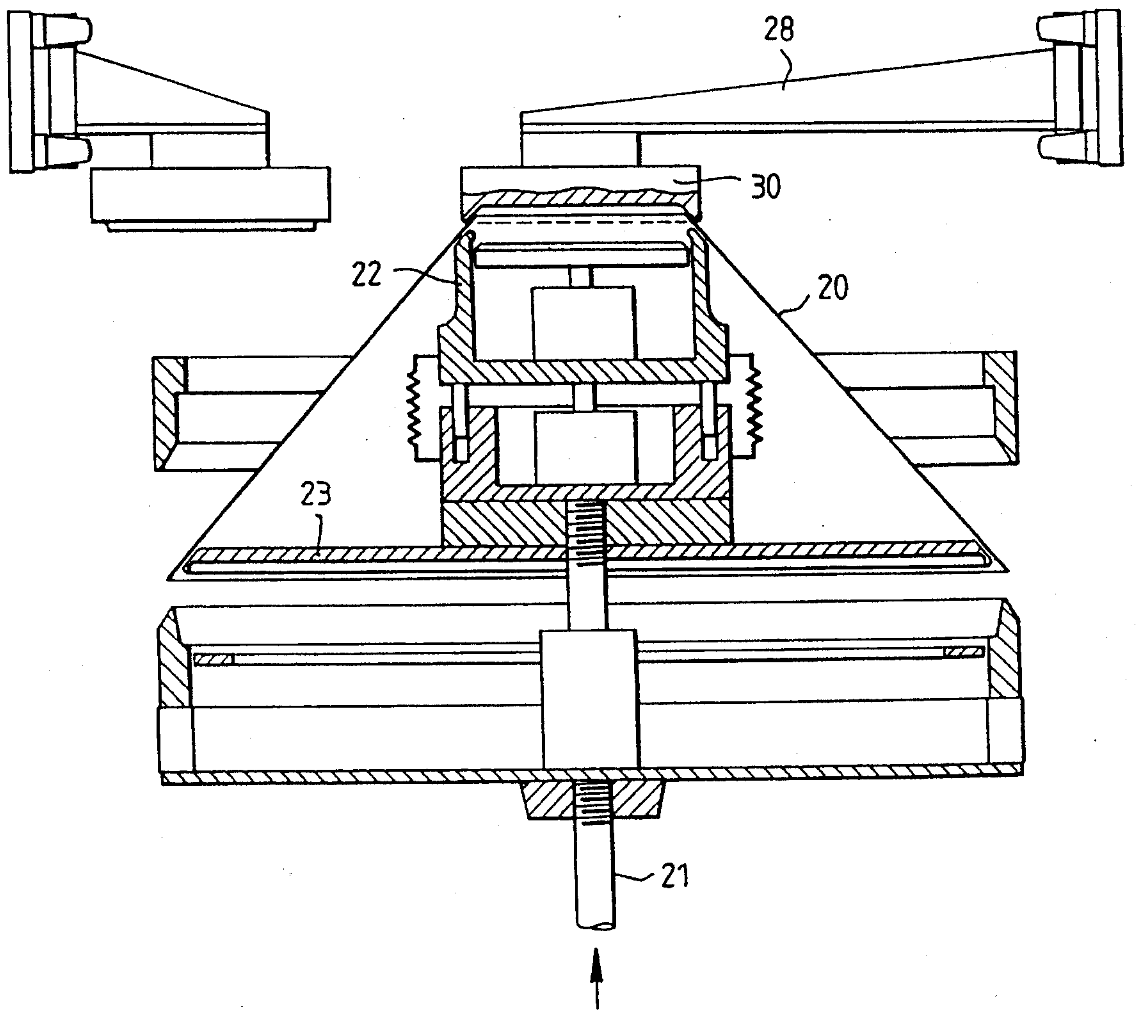

After placing the workpiece 20 in the apparatus as shown in FIG. 3, in a first stage, as indicated in FIG. 4, the upper former 22 and lower former 23, together with associated apparatus parts (see below) are raised, by an actuator 21 to raise the cone 20 into cooperation with an upper heater 30. The former 22 has the general form of an upwardly open cup with a generally cylindrical wall which, at its upper, free edge, has a radially inwardly projecting rounded lip or bead 25 (see FIG. 3). The wall of this cup is chamfered externally at its upper end so as to have a frusto-conical outwardly facing surface of the same conicity as the cone 20 and which outwardly facing surface mates with the inner surface of the cone 20 adjacent the upper end of the latter.

The heater 30 is suspended above the former 22 on a horizontally extending swinging arm 28 pivotable about a vertical axis. The heater 30 has, on its underside, a frusto-conical depression which, as the cone 20 is raised receives the projecting upper edge portion of the cone 20 and heats the same sufficiently to soften the plastics backing material and render the upper free edge portion of the cone 20 pliable and deformable. The softened upper edge portion of the workpiece 20 is deformed radially inwardly and downwardly to some extent by engagement with the contact area of heater 30.

Figure 5:
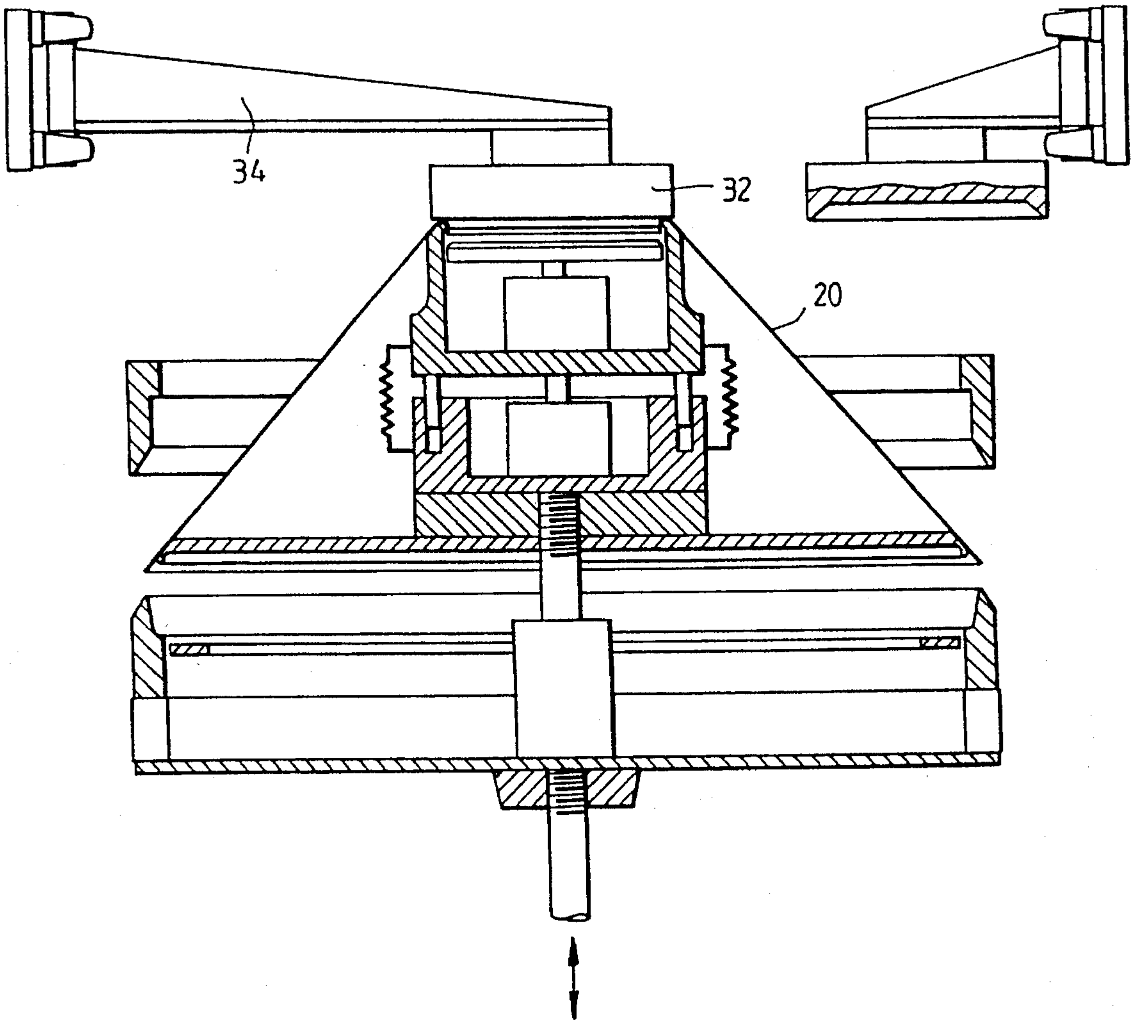

In the next stage, the cone 20, with the formers 22 and 23, is lowered slightly to allow the arm 28 to be swung away to move the heater 30 laterally away from the upper end of the workpiece 20 and a top mould 32 carried by another horizontal arm 34 pivotal about a vertical axis, to be swung into position directly above the former 22 and the upper end of the workpiece 20. The cone 20, with the formers 22 and 23 is then raised again, as illustrated in FIG. 5 to engage the top mould 32 with the upper end of the cone 20. The top mould 32, during this movement, deforms the softened upper edge portion of the workpiece downwardly over the bead 25 at the upper end of the wall of the former 22.

The top mould 32 has the general form of a cylindrical block with a vertical central axis and, on the underside of the mould 32, a shallow, circular projection which fits snugly within the upper end of the former 22. The shallow circular projection is provided by a central plug which is spring loaded into its lowermost position relative to the peripheral part of the top mould. The transition region between the central plug and the peripheral portion takes the form, in the lowermost position of the plug, of a rebate which is concave in axial section through the mould so as to be complementary with the rounded bead 25 at the upper end of the wall of former 22 and thus so as to cooperate closely with that bead. As a result, the softened upper edge portion of the blank 20 is made to fold smoothly around the rounded bead 25 at the upper end of the former 22 and to afford, within the central recess of the former 22, a downwardly depending skirt.

Figure 6:
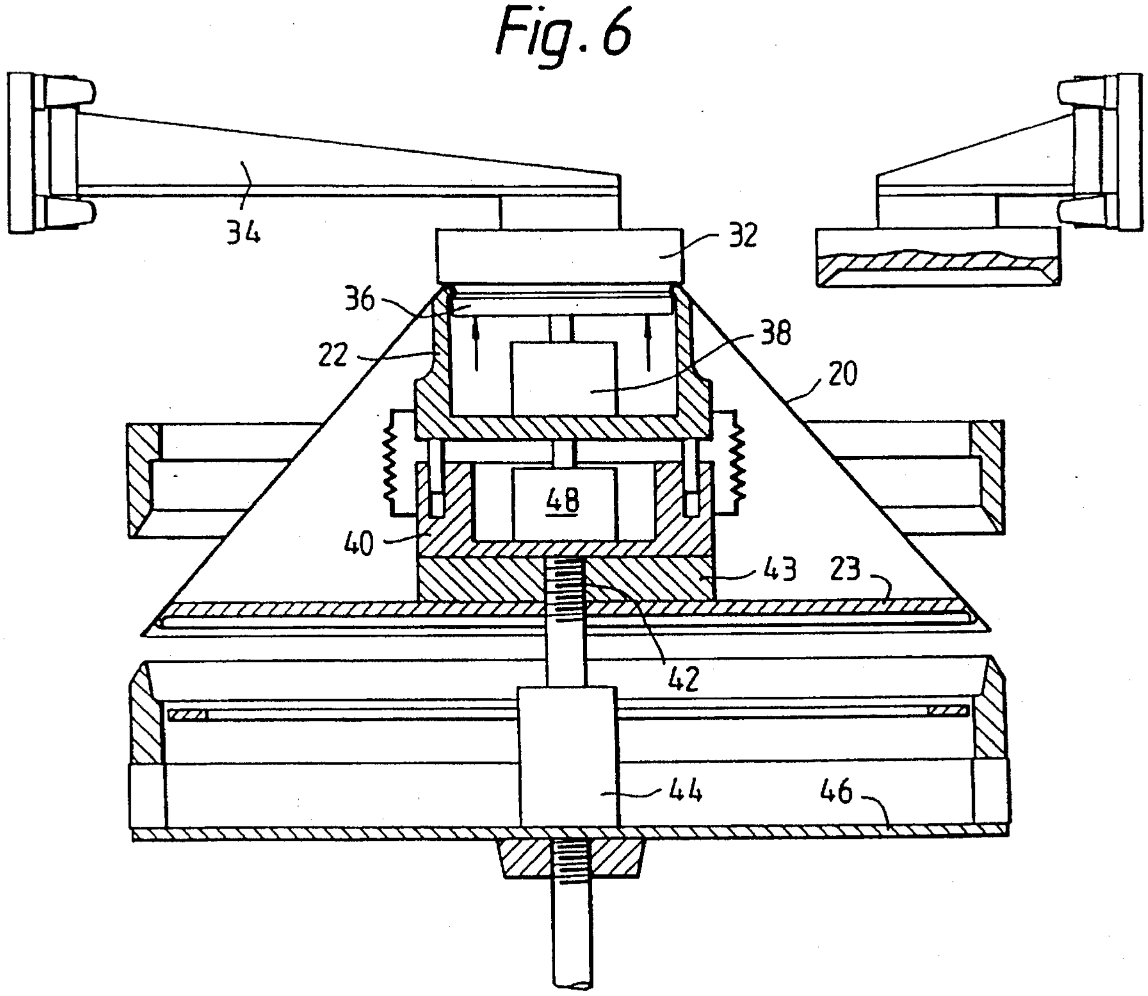
Figure 7:
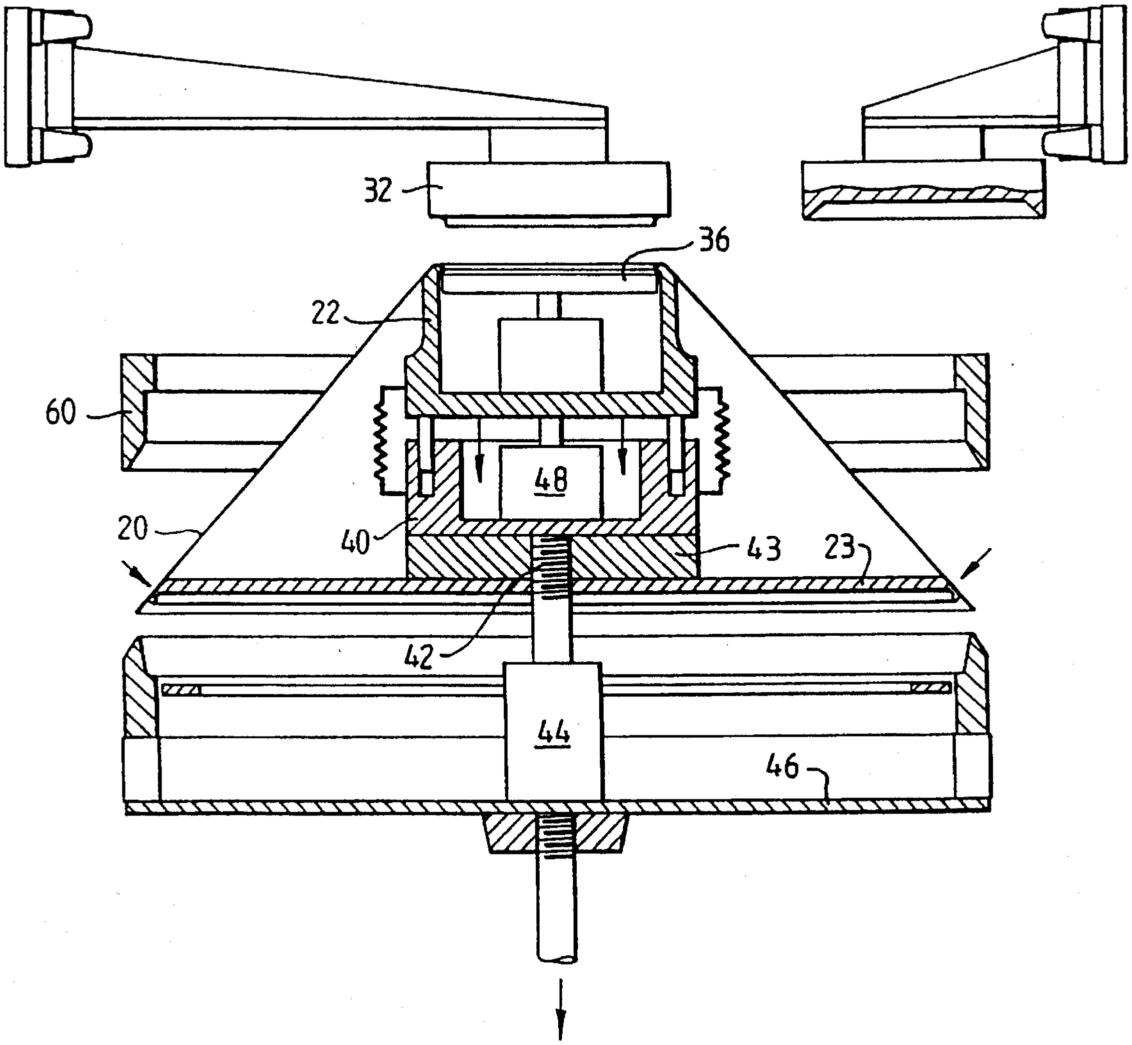

In the next stage, shown in FIG. 6, a circular clamping plate 36, vertically reciprocable within the hollow interior of the former 22 is raised by an actuator 38 so that this downwardly depending skirt of the shade material is engaged between a frusto-conical chamfered upper edge portion of the plate 36 and the inwardly and downwardly facing surface portion of the rounded bead 25 at the upper end of the former 22 and is clamped between bead 25 and the clamping plate 36. Thus, the lowermost part of the inner free edge of the fabric at the upper end of the workpiece 20 is flared radially outwardly somewhat by the plate 36. As the plate 36 is raised into its clamping position, it engages the underside of the central plug of the top mould and moves it upwardly. Thus, it is ensured that the upper part of the workpiece is kept in contact with respective parts of the apparatus during the whole of the operation by which the upper edge portion is formed or rolled. The apparatus is kept in the position shown in FIG. 6 until the material of the blank has cooled before the cone 20, with the formers 22 and 23, is lowered away from the top mould 32 as shown in FIG. 7.

Subsequently, the top mould 32 is swung to one side (see FIG. 8).

It will be noted that the former 22 is movable vertically in a support 40 carried in turn on the upper face of a spacer plate 43 mounted on the upper end of the piston rod 42 of an actuator 44, the cylinder of which is mounted in the middle of a support plate 46 of a lower heater 58, this plate 46 being, in turn, mounted at the upper end of the piston rod of the actuator 21 (not shown in full). The lower former 23 is mounted around the piston rod 42 and is secured to the underside of the spacer 43.

The former 22 is normally biased downwardly, relative to the support 40, by tension springs, indicated schematically in the drawings. During the initial stages illustrated in FIGS. 3 to 6, the former 22 is urged upwardly relative to the support 40 against the bias of these tension springs, by a further actuator 48.

In the stage illustrated in FIG. 7, the actuator 48 is de-energised so that the cone 20, still clamped by the former 22 and clamping plate 36, is drawn downwardly slightly by the tension springs so that the periphery of the lower former 23 is firmly engaged with the cone 20.

The lower former 23 has a downwardly depending frusto-conical skirt 54 (see FIG. 3) terminating in a rounded bead 55 projecting downwardly and radially inwardly relative to the vertical axis of the apparatus.

Figure 8:
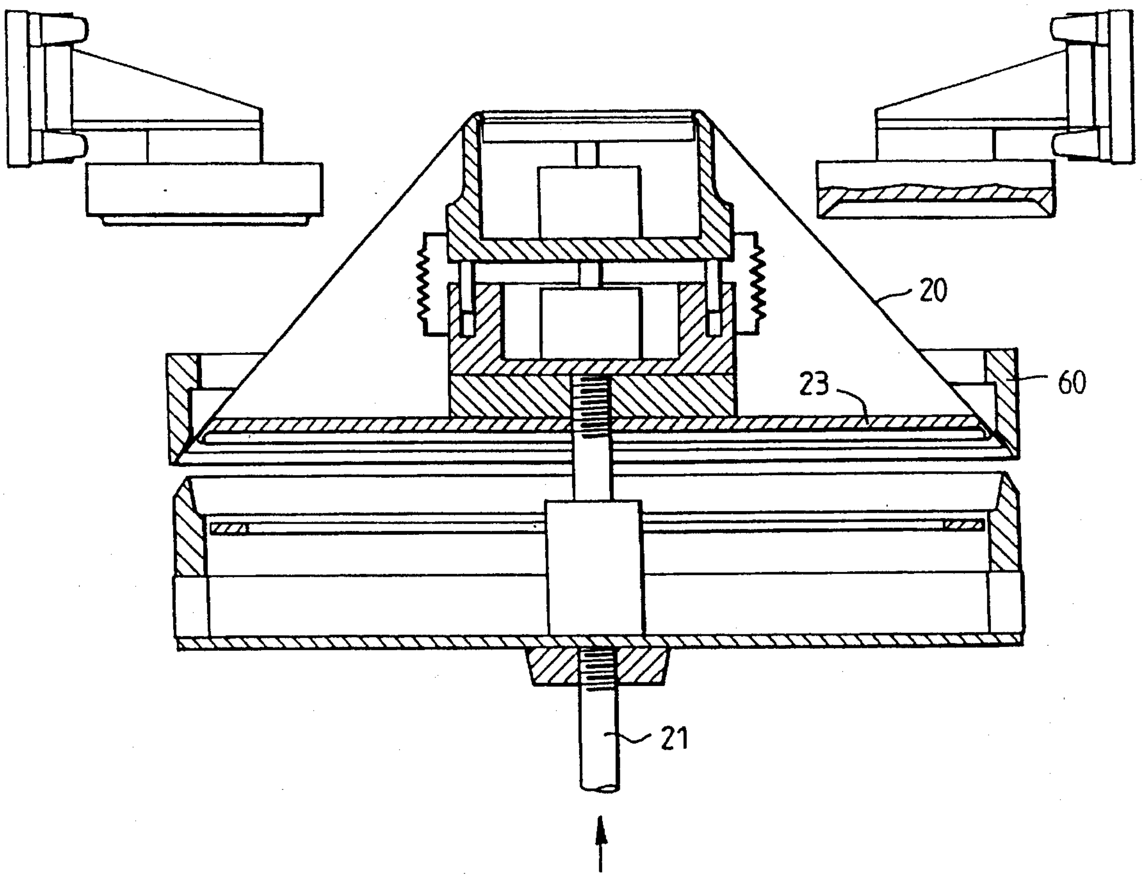
Figure 9:
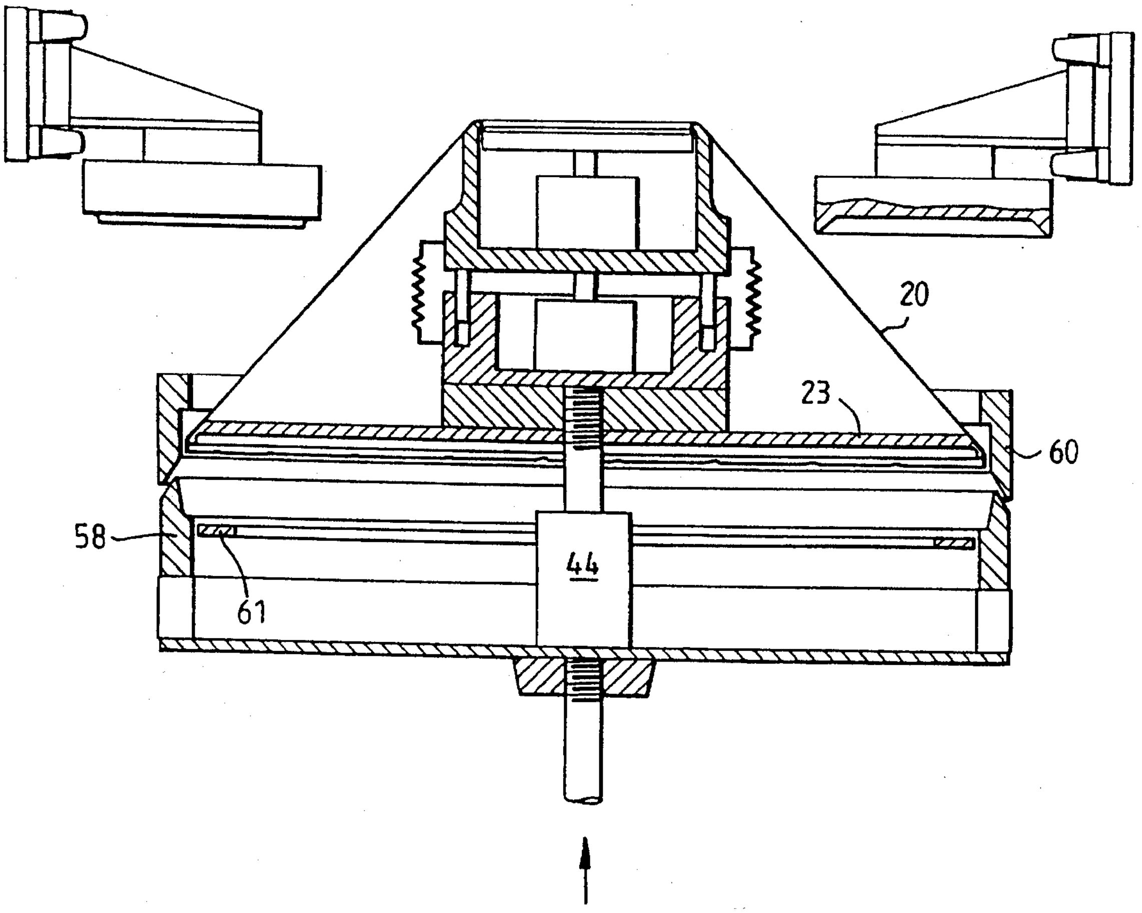

As shown in FIG. 8, with the apparatus in this condition, the rod of actuator 21 is now extended upwardly to move the lower edge of the blank 20 into cooperation with an upper heater 60 for the bottom of the blank 20. In this position, the lower edge of the cone 20 projecting downwardly below the lower former 23 is heated by the heater 60. The heater 60 has the general form of a horizontal annular ring, mounted at a vertical position which is somewhat above those occupied by the former 23 in FIGS. 3 to 7. Internally, the heater 60 has, at its lower end, where it cooperates with the projecting lower edge portion of the cone 20, a concave downwardly diverging frusto-conical surface. The heating of the projecting lower edge portion of the cone 20 by the heater 60 softens and renders deformable that lower edge portion of the fabric. Further upward movement of the assembly, including the cone 20 and former 23 relative to heater 60 moves the lower edge of the cone into a cylindrical recess within heater 60, whereby the softened lower edge of the cone is biased downwardly and inwardly as illustrated in FIG. 9.

Figure 10:
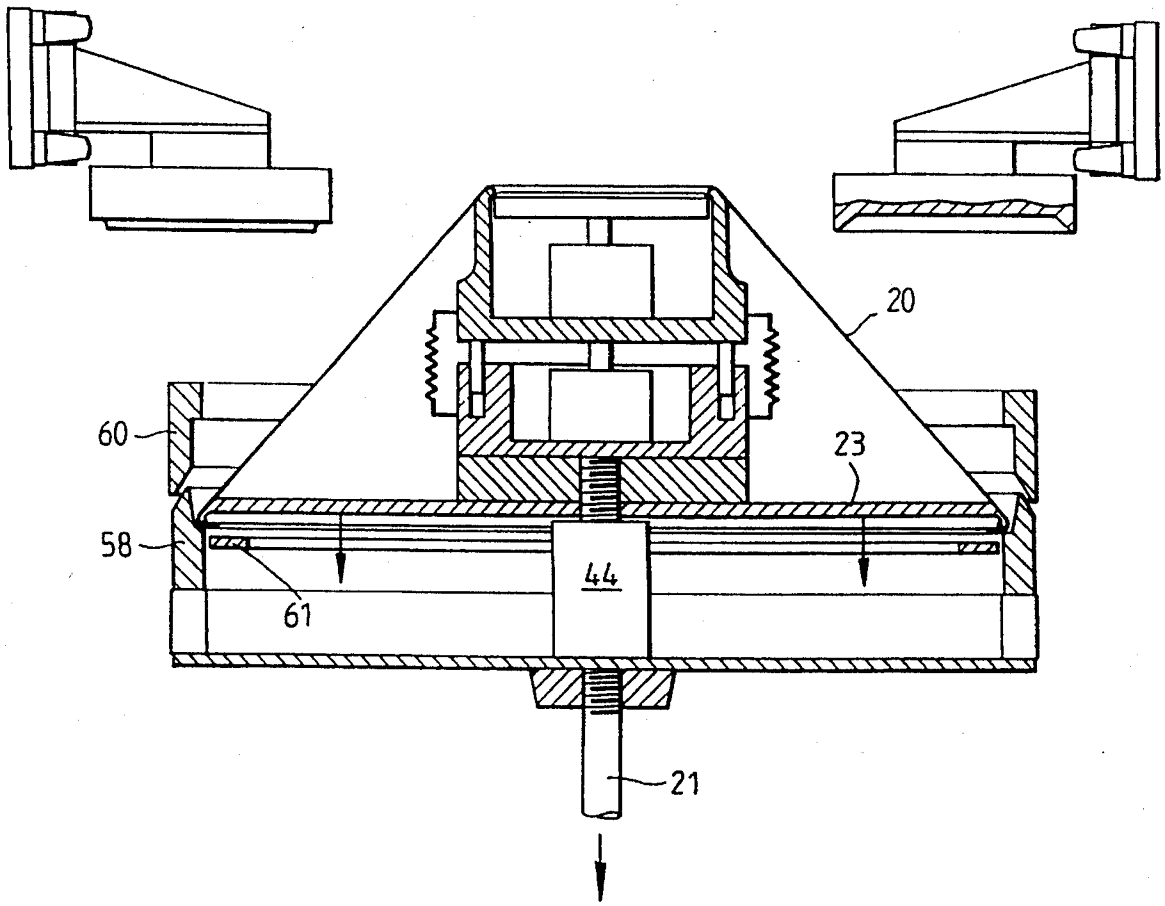

By a lowering of the assembly comprising the former 22, cone 20, support 40, lower former 23, etc. by operation of actuator 44, the softened lower edge portion of the cone 20 is brought into cooperation with a lower heater 58, as shown in FIG. 10. The lower heater 58 has a circumferential generally cylindrical wall co-axial with the formers 22 and 23. This wall has an internal rebate running around its upper free edge and comprising a generally horizontal upwardly facing ledge, an outwardly and upwardly flaring wall surface extending upwardly from said ledge and a concavely radiused transition region between the ledge and the flaring wall portion, which transition region cooperates with the rounded bead 55 at the lower end of the lower former 23, with the shade material interposed therebetween. Thus, the lower edge portion of the shade material is deflected inwardly between the bead 55 and said ledge as illustrated in FIG. 10.

Figure 11:
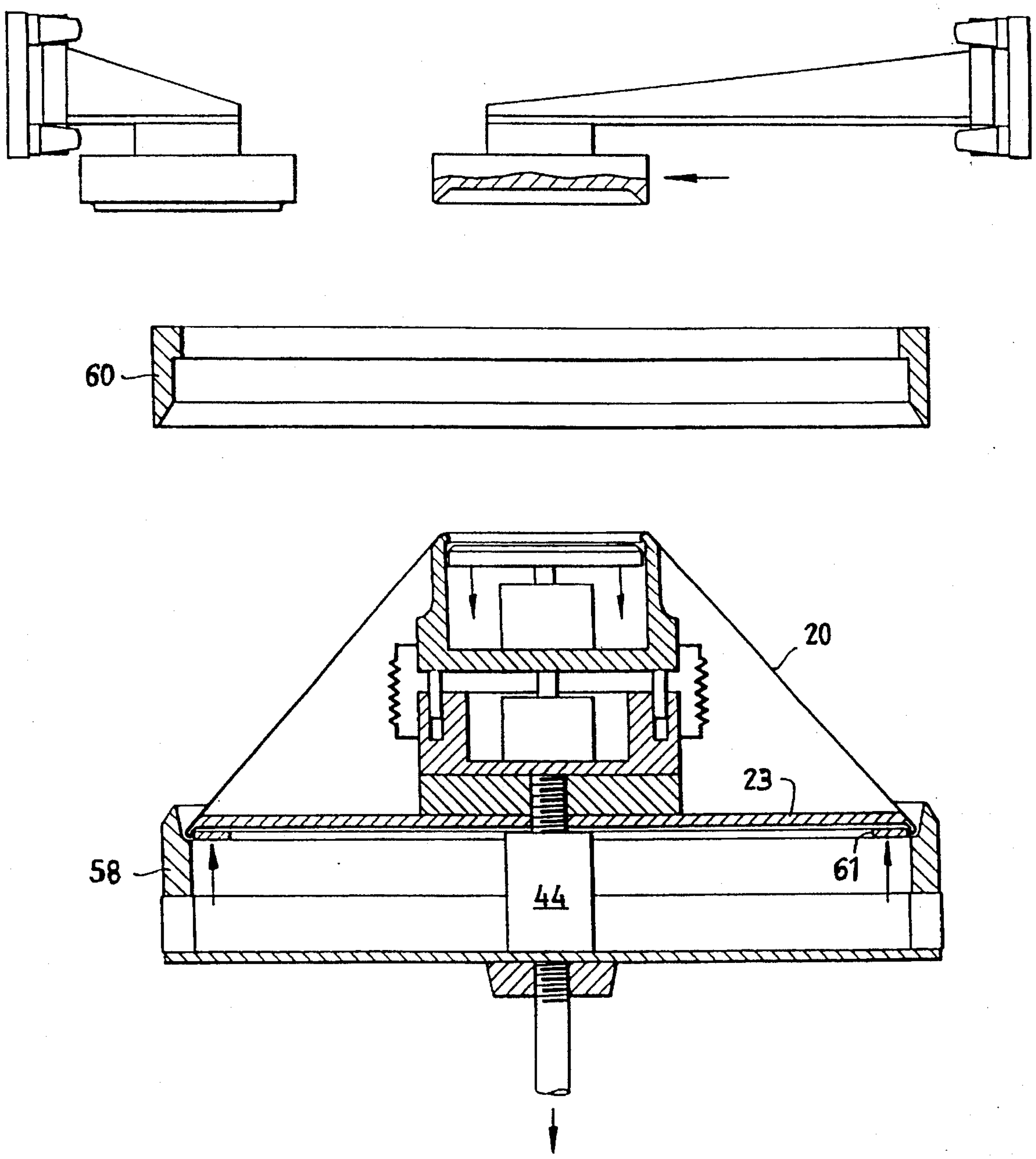
Figure 12:
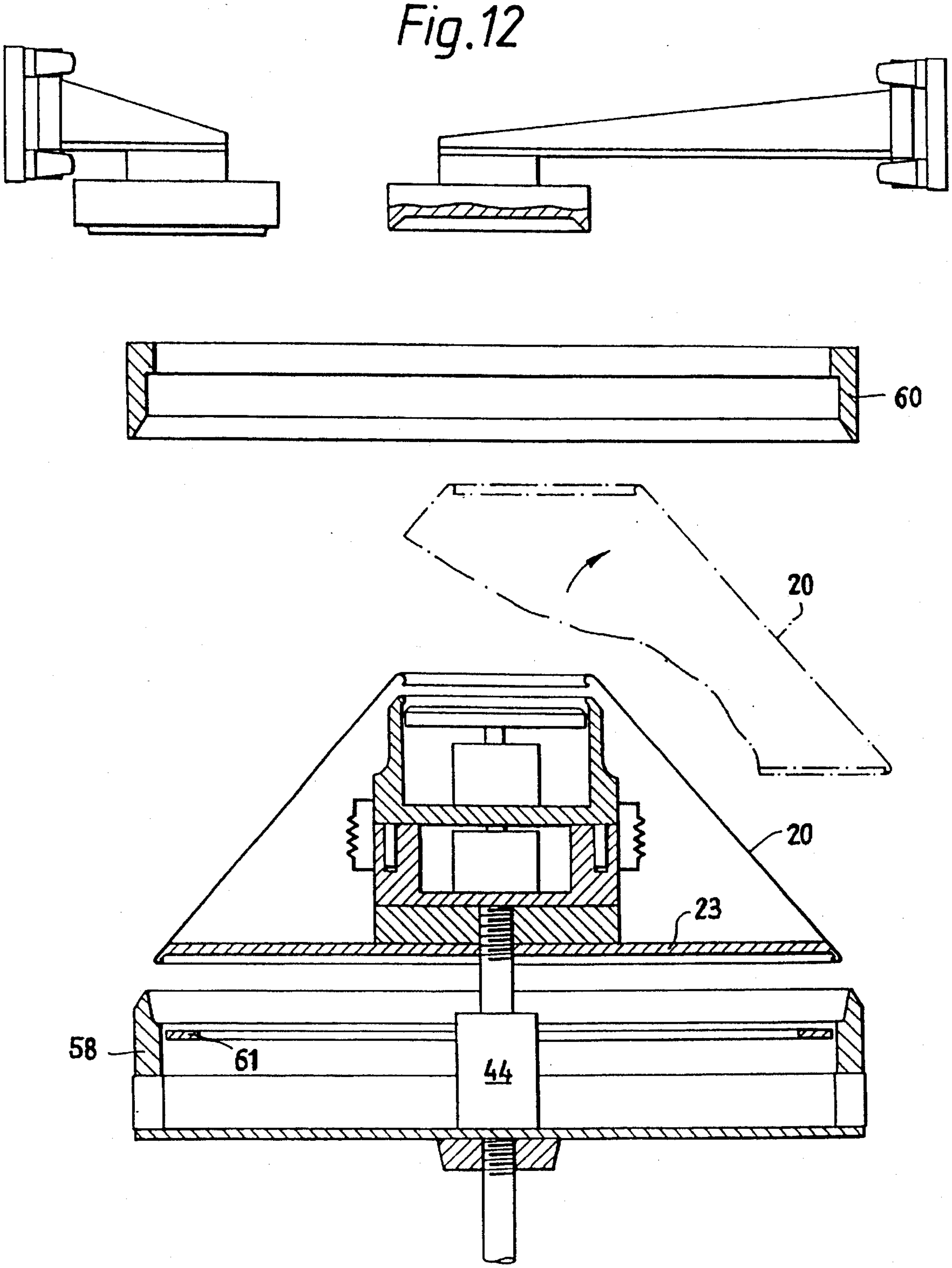

Mounted within the recess defined on the interior of the peripheral wall of the lower heater 58, by means not shown, is a former ring 61 which is now raised, by actuator means (not shown), into the recess defined radially inwardly of the bead 55 around the lower edge of the lower former 23, as shown in FIG. 11, to bring the lower edge region of the shade fully around the bead 55. The former ring 61 has a split or gap at one position around its circumference, allowing expansion of the ring 61 against a spring bias provided by its own resilience, by means of an actuator (not shown). Once the former ring 61 has been raised into the recess defined radially inwardly of the bead 45, the ring is expanded radially outwardly, by the last-mentioned actuator, to ensure that the shade material firmly engages the circumferentially inner surface of the bead 55. At the same time, (or around the same time), the assembly including formers 22, 23, cone 20 and heater 58 is moved downwards as a whole, relative to the upper heater 60, top mould 32 and top heater 30. The former ring 61 maintains its position relative to the former 23 whilst the lower heater 58 is moved downwardly relative to the lower edge of the cone 20 by extension of the actuator 44. After the lower portion of the shade material has cooled, the former ring 61 is allowed to contract and is moved downwardly and the apparatus is now in the position shown in FIG. 12 in which the now-formed blank 20 is clear of the upper and lower heaters (60, 58). The temporary connection between the adjacent edges 12 of the blank is now broken manually to allow the blank to be stripped from the upper and lower formers (22, 23) and removed from the apparatus.

The outer peripheral ring 16 of a mounting bracket such as that indicated at 14 in FIG. 2 is then pushed into the annular channel formed by the rolled over edge portion at the upper end of the shade 20 and the straight edges 12 of the shade material re-united by a permanent weld to complete the shade. Whilst it has been found that, in practice, the rolled edges of the blank 20 are sufficiently stiff to retain the required circular shape without additional stiffening, if desired, a circular stiffening ring, of for example wire, such as illustrated at 18 in FIG. 2, may be fitted within the rolled edge of the lower part of the shade.

It will be appreciated by those in the art that the relevant movement of the various parts of the apparatus between the various stages described may be effected in any desired manner, for example by combinations of movements of the actuators different from those described. By way of example, the top mould 32 could be carried on a fixed bracket at a position on the vertical axis of the apparatus, above the level occupied in FIG. 4, thereby leaving room for introduction and removal of the top heater 30, the arrangement being such that forming of the top edge of the shade would take place simultaneously with the heating of the lower edge of the shade (e.g. in the stage shown in FIGS. 8 or 9).

In a further variant, (not shown), means is provided for rolling the upper and/or lower edges of the shade material fully, i.e. so that either or each of these edges forms a fully closed torus, the material of which overlaps itself somewhat as viewed in vertical section through the shade.

It will also be appreciated that the shade material need not be plastics backed fabric but may be, for example, decorative plastics sheeting or a fabric of thermoplastics fibres.

It will also be appreciated that whilst the shade of which the manufacture is described above with reference to the drawings is generally circular in plan, and the formers 22, 23; heaters 30, 58, 60 etc. have been described as correspondingly circular, a shade could be formed by substantially the same technique, which was substantially square in plan, for example, or of some other shape, the formers and heaters, etc. being, in such a case, of course, of correspondingly square or other shape. Furthermore, the shade need not be of frusto-conical, frusto-pyramidal or other tapering shape but may be cylindrical, for example.

Whilst, in the process described above, the overlapping edge portions 12 are temporarily tack-welded together, in many instances it is preferred to use a double-sided contact adhesive tape located between the overlapping edge portions to secure these together temporarily, the tape remaining attached to one of the edge portions when the temporary connection between the overlapping edge portion is broken manually for removal of the formed blank from the apparatus, and serving to hold the overlapping edges temporarily together again after fitting of the mounting bracket and lower stiffening ring (if used). The tape, and/or the adhesive thereon, is so formulated that by, for example, ultrasonic or induction heating, or by u.v. curing of the adhesive, the temporary bond between the overlapping edge portions 12 can finally be rendered permanent in a straightforward finishing step.

In a variant of the process described above with reference to FIGS. 1 to 12, which variant is described below with reference to FIGS. 13 and 14, the need to break the connection between the adjacent edges 12 of the blank prior to removal of the blank from the upper and lower formers 22, 23 is avoided and a stiffening ring is automatically provided within the rolled lower edge part of the shade. In FIGS. 13 and 14, parts corresponding with parts in FIGS. 1 to 12 have the same references.

In the variant to be described with reference to FIGS. 13 and 14, the former 23 of FIGS. 3 to 12 is replaced by a structure comprising a lower horizontal plate 80 secured to the upper end of the actuator rod 42, an upper horizontal plate 82 supported from the plate 80 by pillars or side walls 84 and horizontal arms 86 mounted on the upper plate 82, extending radially with respect to the vertical central axis of the apparatus, and guided for radial sliding movement with respect to the plate 82. There may, for example, be three or four such arms 86, spaced apart angularly at regular intervals about the vertical axis of the apparatus. The arms 86 are movable radially outwardly and inwardly in unison by actuating means, for example by a tapering cam or wedge member (not shown), which acts on the inner ends of arms 86 and which cam or wedge member is carried by the piston rod of an actuator 88 which has its cylinder mounted on plate 80, so that vertical displacement of said cam or wedge urges the arms 86 radially outwardly. Return springs (not shown) may be provided to retract the arms 86 radially inwardly when the piston rod of actuator 88 is closed. Any other convenient actuating arrangement may, of course, be provided for moving the arms 86 radially outwardly and inwardly.

The outer end portions, at least, of the arms 86 are formed as, or incorporate, permanent or electro-magnets, and are directed downwardly and outwardly as shown in FIGS. 13 and 14 to terminate in concave pole pieces adapted to engage a stiffening ring 90 of round section iron wire.

In the variant shown in FIGS. 13 and 14 the shapes, in vertical section, of the heater 58 and former ring 61 are slightly different from those in FIGS. 2 to 12. Thus, the former ring 61 has a rebate, concavely arcuate in vertical section, running around the periphery of ring 61 at its upper edge and the annular rebate around the interior of the heater 58 is of complementary arcuately concave shape in vertical section so as to form, with the concave rebate around the ring 61, when the ring 61 and heater 58 are in horizontal alignment, a circular upwardly open channel of half-round section, which is complementary with the stiffening ring 90. Before the cone or workpiece 20 is mounted in the apparatus of FIGS. 13 and 14, the stiffening ring 90 is dropped into the heater 58 to lie horizontally therein on the former ring 61, around the periphery of the latter. The arms 86 are then extended radially outwardly and the ring 61 raised to lift the stiffening ring 90 into engagement with the outer, downwardly directed ends of arms 86, whereby the stiffening ring 90 is held by magnetic attraction on the pole faces at the outer ends of the arms 86. The ring 61 is subsequently lowered away from the stiffening ring.

The position is now substantially as illustrated and described with reference to FIG. 3 herein, with the ring 90, in combination with arm 86 and plate 82, replacing the unitary former 23, the ring 90 effectively performing the same function as the skirt 54 of the former 23. The forming of the cone 20, mounting of the cone 20 in the apparatus and the forming and rolling over of the upper and lower edges of the blank are carried out substantially as described with reference to FIGS. 3 to 12 but with the differences noted below. Thus, FIG. 14 corresponds substantially with FIG. 9 and shows the stage where the cone 20 after it has been lowered into engagement with the stiffening ring 90, is being lowered, with the arms 86 and ring 90 into the lower heater 58. However, it should be noted that in this variant, the upper heater 60 of the first-described arrangement is omitted and the lower edge of the cone 20 is not heated or softened before being brought into engagement with the lower heater 58. However, in this variant, the heater 58 has an inner periphery the upper region of which is part-elliptical as viewed in axial (vertical) section, and which defines, at the upper end of the heater, a wider opening to receive the lower edge of the cone than has the lower heater 58 of FIGS. 3 to 12. Accordingly the cone 20, with its lower edge unheated and undeformed, is lowered gradually so that its lower edge comes relatively slowly into contact with heater 58 and is gradually moved downwards into heater 58 whilst being heated, softened and formed until the ring 90 and the portion of the cone material therearound reach the bottom of the part-elliptical recess (at which stage, of course, the free edge of the softened cone material is projecting radially inwardly from heater 58). The raising of former ring 61 then rolls the lower free edge of the shade material around the stiffening ring 90, in the same way as the material is rolled around the peripheral bead 55 in the arrangement of FIGS. 3 to 12. As in the previous embodiment, the former ring 61 remains in place while the heaters are moved from the lower edge of the product, until the shade material has cooled. The arms 86 are then retracted radially inwardly, away from the stiffening ring, allowing the shade, with the stiffening ring, to be removed from the apparatus.

It will be noted that, in this variant, there is no need to sever the connection between the free edges 12 of the workpiece in order to remove the workpiece from the apparatus, nor, of course, for insertion of the stiffening ring 90. Thus, in this variant the free edges 12 are connected once and for all at the start of the manufacturing operation, by an appropriate welding or adhesive bonding process and it is not necessary subsequently to disturb the joint. The flexibility and resilience of the shade material allows the upper end of the product to be readily pulled off the upper end of the former 22 and the mounting frame 14 can be pushed into place with equal readiness, preferably after applying an appropriate adhesive to the ring 16 for security of fixing.

It will be appreciated that an arrangement (not shown) may be provided for supporting an upper stiffening and former ring, for example forming part of a lamp fixing bracket within the upper end of the cone or workpiece 20, instead of the former 22. However, post-forming location of the upper ring, bearing the lamp bracket, does not generally present significant difficulty in the manufacturing method described with reference to the drawings.

We claim:

1. An apparatus for manufacturing a lampshade from a heat-deformable sheet material, said apparatus comprising: supporting means for supporting a hollow body formed from the sheet material with the hollow body having upper and lower peripheral edges, said supposing means including upper forming means centred on an axis for location within the hollow body adjacent the upper peripheral edge of the hollow body; ring support means for supporting a stiffening ring within the hollow body adjacent the lower peripheral edge of the hollow body said ring support means comprising a plurality of radially movable arms extending radially with respect to the axis with each arm including a magnet and terminating on a radially outer end in a concave pole piece configured to contact said stiffening ring; means for releasably supporting said stiffening ring with said ring in peripheral engagement with an interior surface of the hollow body adjacent a peripheral edge thereof, so that the lower marginal edge portion of the body projects beyond said stiffening ring; means for heating the lower marginal edge portion; means for engaging the lower marginal edge portion after such heating and at least one of folding and rolling the lower marginal edge portion around said stiffening ring; and means for holding the formed edge portion in place until the material has cooled.

2. The apparatus according to claim 1, wherein said arms are mounted on a plate extending substantially perpendicular to the axis, the apparatus including means for guiding said arms for radial sliding movement on said plate.

3. The apparatus according to claim 1, including three said arms spaced apart angularly at regular intervals about the axis.

4. The apparatus according to claim 1, including four said arms spaced apart angularly at regular intervals about the axis.

5. The apparatus according to claim 1, wherein the axis is substantially vertical and said means for heating the lower marginal edge portion of the hollow body includes an annular heater centred on the axis and having an inner peripheral wall, the apparatus further including a former ring centred on the axis and having an external diameter configured to pass through said annular heater, said inner peripheral wall of said annular heater diverging upwardly to an upper edge of the heater and having an inwardly convergent lower portion, means for mounting said annular heater, said former ring and said arms for vertical movement relative to one another and actuating means for effecting such movement.

6. The apparatus according to claim 3, wherein said inner peripheral wall of said annular heater is part elliptical in axial section.

7. The apparatus according to claim 3, wherein said former ring includes a recess around its upper peripheral edge to accommodate a lower inner part of a surface of a stiffening ring.

8. The apparatus according to claim 1, wherein said magnet is selected from the group consisting of a permanent magnet and an electro-magnet.

9. The apparatus according to claim 1, wherein the stiffening ring is a hollow wire.

* * * * *

UNITED STATES PATENT AND TRADEMARK OFFICE

CERTIFICATE OF CORRECTION

PATENT NO. : 5,603,800

DATED : February 18, 1997

INVENTOR(S) : Jeremy D. Wheatley and Andrew C. Diamond

It is certified that error appears in the above-indentified patent and that said Letters Patent is hereby corrected as shown below:

Title page, Abstract, line 22, "beads" should read --bead--.

Column 2 Line 12 "U.S. Pat. No." should read --USSN--.

Column 3 Line 13 "U.S. Pat. No." should read --USSN--.

Column 5 Line 57 "bead 45" should read --bead 55--.

Claim 1 Column 8 Line 58 "supposing means" should read --supporting means--.

Claim 1 Column 8 Line 63 after "hollow body" insert --,--.

Signed and Sealed this

Tenth Day of June, 1997

Attest:

BRUCE LEHMAN

Attesting Officer

*Commissioner of Patents and Trademarks*